United States Patent
Wentworth et al.

(10) Patent No.: US 6,755,593 B2
(45) Date of Patent: Jun. 29, 2004

(54) PIPE REPLACEMENT METHOD AND ROTARY IMPACT MECHANISM FOR PIPE BURSTING

(75) Inventors: Steven W. Wentworth, Brookfield, WI (US); Robert F. Crane, Oconomowod, WI (US); Paul W. Hau, Watertown, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 0 days.

(21) Appl. No.: 10/054,666

(22) Filed: Jan. 22, 2002

(65) Prior Publication Data

US 2002/0114671 A1 Aug. 22, 2002

Related U.S. Application Data

(60) Provisional application No. 60/263,171, filed on Jan. 22, 2001.

(51) Int. Cl.[7] .............................. F16L 55/18; E21B 7/04
(52) U.S. Cl. ............................... 405/184.3; 405/154.1; 405/156; 405/174; 138/97; 138/98; 254/29 R; 175/19; 175/53; 175/106
(58) Field of Search .............................. 405/154.1, 156, 405/184.1–184.4, 184, 174, 175; 138/97, 98; 254/29 R; 175/19, 53, 106, 398–400, 171

(56) References Cited

U.S. PATENT DOCUMENTS

| | | | |
|---|---|---|---|
| 4,505,302 A | | 3/1985 | Streatfield et al. ............ 138/97 |
| 4,720,211 A | | 1/1988 | Streatfield et al. ........... 405/154 |
| 4,738,565 A | | 4/1988 | Streatfield et al. ........... 405/154 |
| 4,993,503 A | * | 2/1991 | Fischer et al. ................. 175/62 |
| RE33,793 E | * | 1/1992 | Cherrington et al. .......... 175/61 |
| 5,174,684 A | * | 12/1992 | Keener et al. ............. 405/183.5 |
| 5,302,895 A | * | 4/1994 | Philpot ......................... 324/220 |
| 5,427,475 A | * | 6/1995 | Coss ............................ 405/184 |
| 5,580,188 A | * | 12/1996 | Nowak ......................... 405/184 |
| 5,782,311 A | | 7/1998 | Wentworth .................... 175/53 |
| 5,895,176 A | * | 4/1999 | Puttman ....................... 405/184 |
| 5,984,582 A | * | 11/1999 | Schwert ....................... 405/184 |
| 6,125,950 A | * | 10/2000 | Osborne ....................... 175/398 |
| 6,148,935 A | | 11/2000 | Wentworth et al. .......... 175/398 |
| 6,161,636 A | * | 12/2000 | Osborne ....................... 175/399 |
| 6,283,229 B1 | * | 9/2001 | Wentworth et al. .......... 405/184 |
| 6,305,880 B1 | * | 10/2001 | Carter et al. .............. 405/184.3 |
| 6,357,967 B1 | * | 3/2002 | Putnam .................... 405/184.3 |
| 6,443,657 B1 | * | 9/2002 | Brahler ........................ 405/184 |

FOREIGN PATENT DOCUMENTS

GB  2213904  *  8/1989  .................. 405/184

* cited by examiner

Primary Examiner—Jong-Suk Lee
(74) Attorney, Agent, or Firm—Philip G. Meyers

(57) ABSTRACT

An impactor for use with a directional boring machine having a drill string connectable to the impactor for pulling the impactor through an existing pipeline uses rotation of the drill string to drive an internal striker. The internal striker delivers impacts in the pulling direction to an impactor housing as the impactor housing tows a replacement pipe behind it. The impactor housing is free to move axially in response to impacts from the striker over a limited distance in the pulling direction independently of the replacement pipe and drill string.

14 Claims, 9 Drawing Sheets

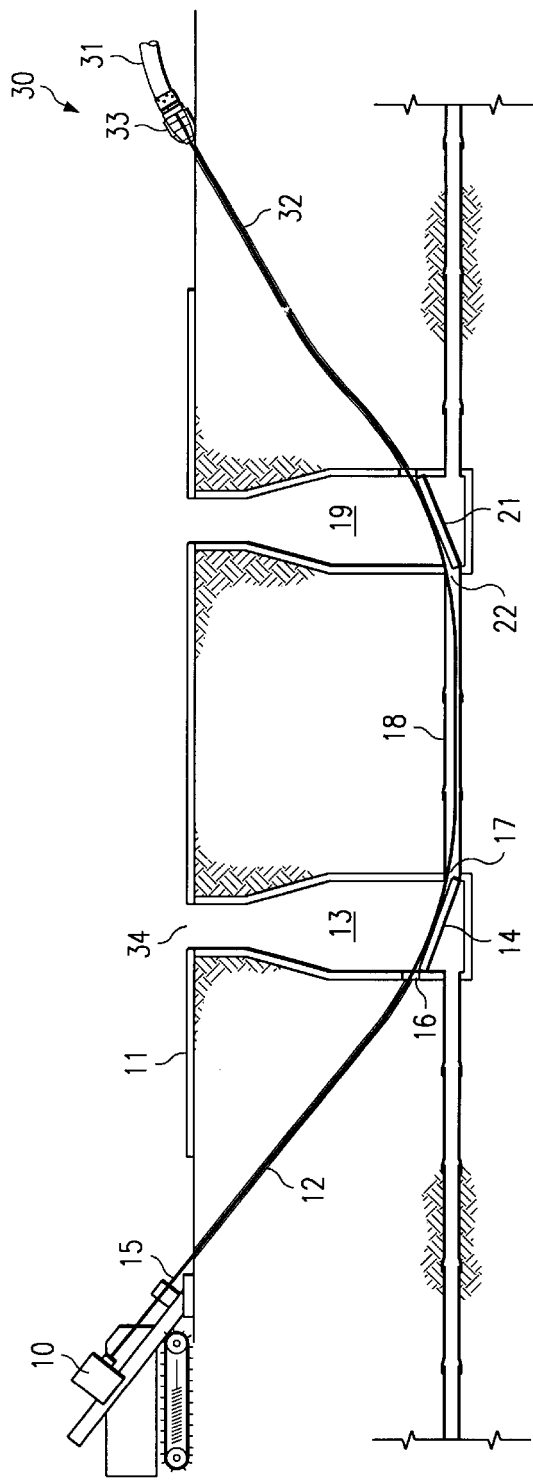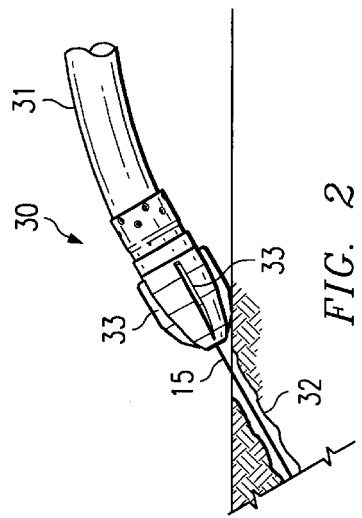

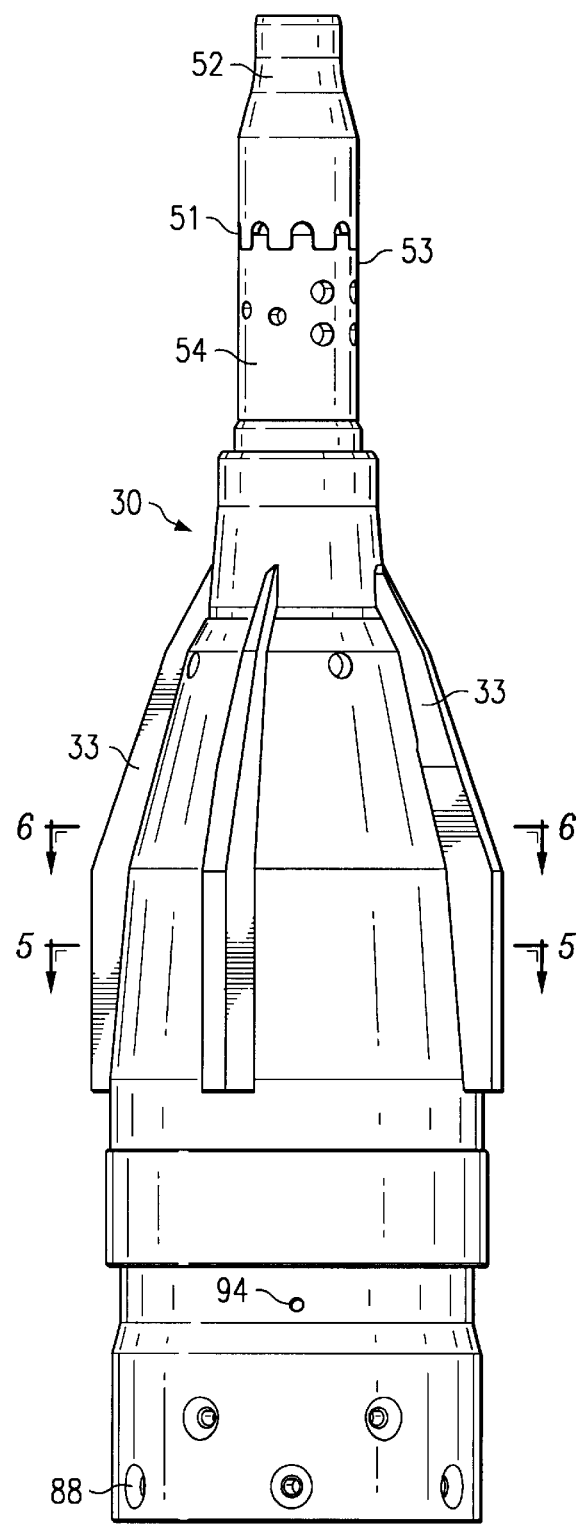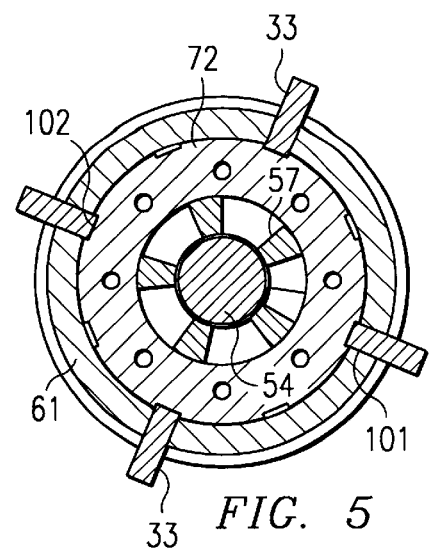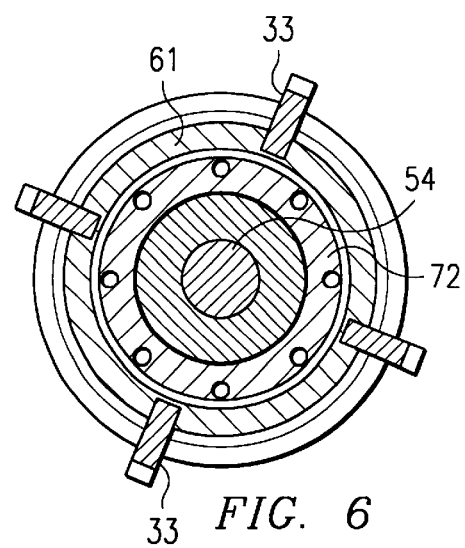
FIG. 4
FIG. 5
FIG. 6

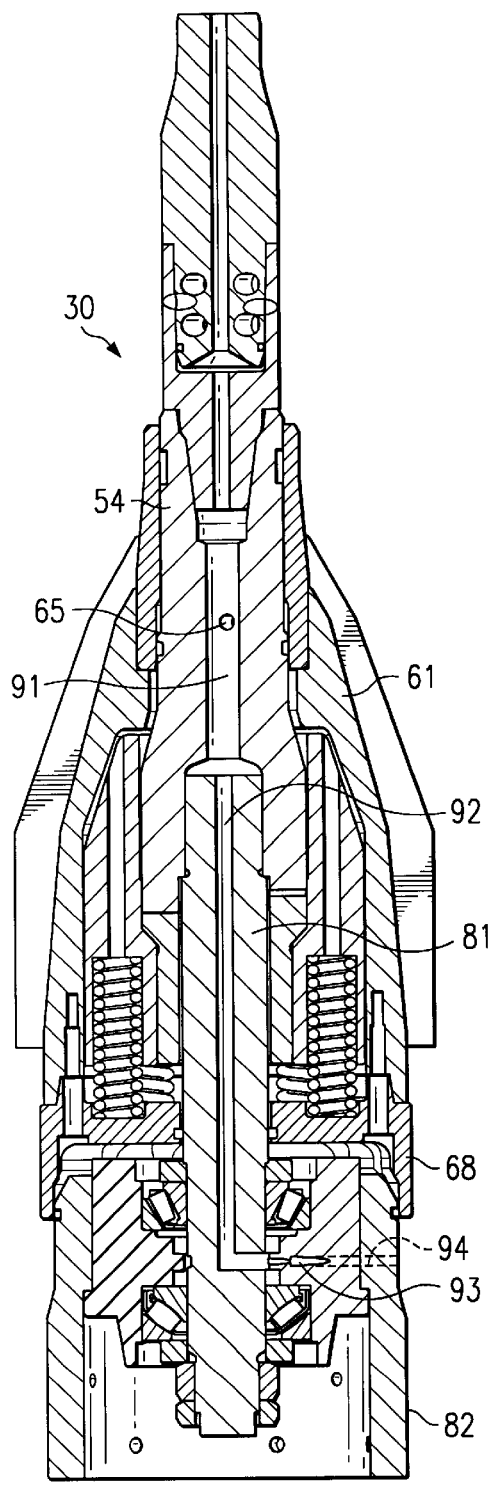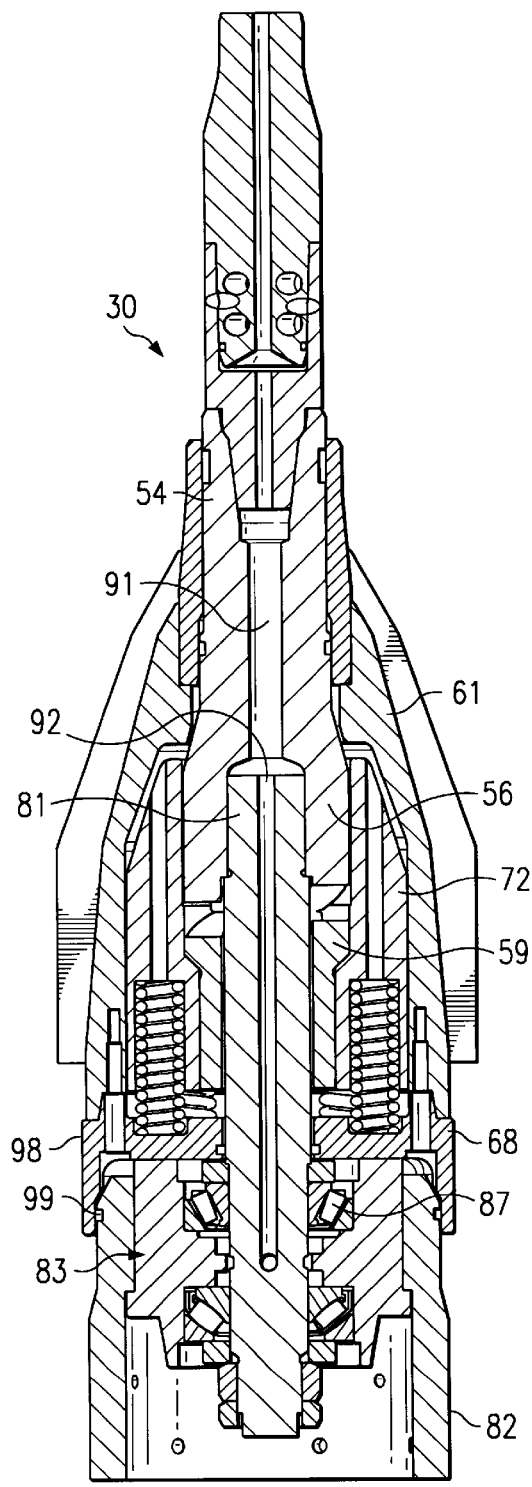
FIG. 9                                    FIG. 10

PIPE REPLACEMENT METHOD AND ROTARY IMPACT MECHANISM FOR PIPE BURSTING

This application claims priority of U.S. Provisional Application Serial No. 60/263,171, filed Jan. 22, 2001.

TECHNICAL FIELD

This invention relates to systems for pipe bursting and replacement.

BACKGROUND OF THE INVENTION

A variety of systems are now known for the installation of underground pipes, particularly for the replacement of an existing deteriorated pipe. In one widely practiced method, a pneumatic impact boring tool is sent through the existing pipeline such that the head of the tool, which may be provided with blades that apply intense local pressure to the existing pipe, fractures or splits the existing pipe. See, for example, Streatfield et. al. U.S. Pat. Nos. 4,720,211, 4,738, 565 and 4,505,302. A replacement pipe, typically made of plastic such as HDPE, can be drawn along behind the boring tool. This process has proven effective commercially because it bursts the old pipe and replaces it with a new pipe at the same time. However, the system relies on a pneumatic impact tool, which in turn requires an air compressor. Exhaust from the impact tool is vented into the interior of the replacement pipe, which is unacceptable for certain types of pipe installations, such as gas and water lines.

Directional drilling machines are less effective for pipe bursting, especially for hard to burst pipes like cast iron, because the steady pushing force of the drill string lacks the impact power of a pneumatic impact boring tool. Thus, in some instances, a directional borer or winch is used to pull a pneumatic impact tool through an existing pipeline in order to burst the existing pipe and pull in the replacement pipe. These alternatives are effective but require considerable equipment and manual labor.

Wentworth U.S. Pat. No. 5,782,311 describes a pipe bursting apparatus that uses a directional boring machine capable of simultaneously rotating and pulling a drill string and an impact tool connectable to the drill string. The impact tool includes a tubular housing ending in a front bursting head, an input shaft, bearings supporting the input shaft for rotation within the housing, a striker disposed for reciprocation within the housing to deliver impacts to a front anvil, and a drive mechanism for simultaneously pulling the impact tool forward in response to a pulling force on the input shaft and for reciprocating the striker to drive the tool forward by the action of cyclic impacts on the front anvil. The apparatus can carry out a pipe bursting operation in a manner that eliminates the need to use a separate pneumatic impact tool to burst the existing pipe. This impact mechanism is effective but has the disadvantage of creating torsion on the drill string which can accelerate wear of the drill string and boring machine.

SUMMARY OF THE INVENTION

A method for replacement of an existing pipeline according to the invention includes the steps of:

(a) forming a first access tunnel from a first location on the surface of the ground to a starting location of the pipeline;

(b) forming a second access tunnel from a second location on the surface of the ground to a finishing location of the pipeline;

(c) then inserting a drill string through the first access tunnel, then into the pipeline at the starting location, then through the inside of the pipeline to the finishing location, then out of the pipeline and back to the surface of the ground through the second access tunnel;

(d) then installing a pipe bursting device on the drill string, the device having a length of replacement pipe attached thereto;

(e) then pulling the drill string with pipe bursting device attached back through the second access tunnel and into the pipeline, thereby drawing the replacement pipe behind the pipe bursting device and widening the second access tunnel;

(f) then pulling the pipe bursting device through the existing pipeline to burst the existing pipeline and pull the replacement pipe in to replace the existing pipeline; and (g) removing the pipe bursting device from the replacement pipe when the replacement pipe is fully installed; and (h) removing the pipe bursting device and drill string from the ground.

The word "then" is used to mean that the step is performed after the immediately preceding step. It will be appreciated from the detailed description that follows that steps such as (a) and (b) need not be performed in the order listed to be within the scope of the present invention.

The pipe bursting device preferably is an impactor that delivers cyclic impacts to aid in bursting the existing pipeline. The impactor includes a housing, a striker disposed within the housing and a mechanism for causing the striker to deliver impacts to the housing in response to rotation of the drill string. For purposes of the present invention, "bursting" includes shattering an existing pipe (such as one made of ceramic), slitting it and pushing the resulting pieces or strips aside to make room for the new pipe, or any other mechanical operation which destroys the original pipe. The pipe bursting device may also be an expander for widening an existing hole of a type known in the art, with or without an impact mechanism.

According to a preferred form of the method, steps (a)–(e) comprise drilling the first access tunnel with a directional boring machine using a drill string having a drill bit mounted thereon, such as either a bit for drilling in soil, rock, or both, removing the bit and then inserting the drill string through the existing pipeline from the starting location to the finishing location, and then if necessary replacing a drill bit on the drill string and drilling the second access tunnel. The second drill bit may be the same or different from the first. The drill bit is then replaced with the pipe bursting device, and pipe bursting device is pulled through the second access opening, thereby widening the second access opening, prior to pulling it through the existing pipeline.

Often the starting and finish locations will coincide with manholes or other existing structures, or with a hole dug from the service to provide access. In such a case, a preferred method of the invention contemplates drilling the first access tunnel with a directional boring machine using a drill string having a drill bit mounted thereon which drills a hole in a wall of the manhole or other similar structure, which manhole adjoins the starting location. The first and second access tunnels each define acute angles relative to the ground, e.g., a downward slope such as 30–60°, and the existing pipeline extends in a substantially horizontal direction. It is useful to place a deflection plate in a position within the hole at the starting location for contacting the drill string and deflecting it from its acute angle in the first access tunnel to the direction of the existing pipeline. Similarly in a second pit or manhole, a similar plate is positioned if needed to deflect the drill string upwardly.

According to a further aspect of the invention, the pipe bursting device is pulled without rotation in steps (e) and/or (f) in order to provide a more accurate bore. A sonde of a type well known on the art may be mounted on the pipe bursting head so that the actual depth and direction of the second access tunnel may be closely monitored (as where obstacles are nearby) or mapped.

The invention provides an impactor for use with a directional boring machine having a drill string connectable to the impactor for pulling the impactor through an existing pipeline. Rotation of the drill string is used to drive an internal striker that delivers impacts in the pulling direction to an impactor housing as the impactor housing tows a replacement pipe behind it. The impactor housing is free to move in response to impacts from the striker over a limited distance in the pulling direction independently of the replacement pipe and drill string.

In a preferred form, such an impactor for use with a directional boring machine having a drill string that pulls the impactor while rotating includes a rotary drive shaft connectable to a terminal end of the drill string, an impactor housing mounted on the drive shaft for lengthwise sliding movement thereon, a striker disposed in an internal chamber of the housing, and one or more springs biasing the striker to a forward position in the chamber. A tail assembly behind the housing includes a bearing whereby the rotary drive shaft can pull the tail assembly while rotating within the bearing structure, and suitable means for pulling a pipe to be installed behind the tail assembly. A cam and follower assembly cause rotation of the drive shaft inside the housing to alternately move the striker rearwardly, compressing the spring, and then forwardly under the force of the compressed spring to impact an interior surface of the housing, cause the housing to move forward relative to the drive shaft and tail assembly. The pulling force of the drill string causes the housing to resume its former position after impact. These and other aspects of the invention are described in the detailed description that follows.

BRIEF DESCRIPTION OF THE DRAWINGS

In the accompanying drawings, like numerals represent like elements except where section lines are indicated:

FIG. 1 is a schematic diagram of an installation according to a method of the invention;

FIG. 2 is an enlarged view of the upper right corner of FIG. 1;

FIG. 4 is a side view of an impactor according to the invention;

FIG. 5 is a cross-sectional view along the line 5—5 in FIG. 4;

FIG. 6 is a cross-sectional view along the line 6—6 in FIG. 4;

FIG. 9 is a lengthwise sectional view of the impactor of FIG. 4;

FIG. 10 is a lengthwise sectional view taken at a different angle than FIG. 9;

Figure 3:
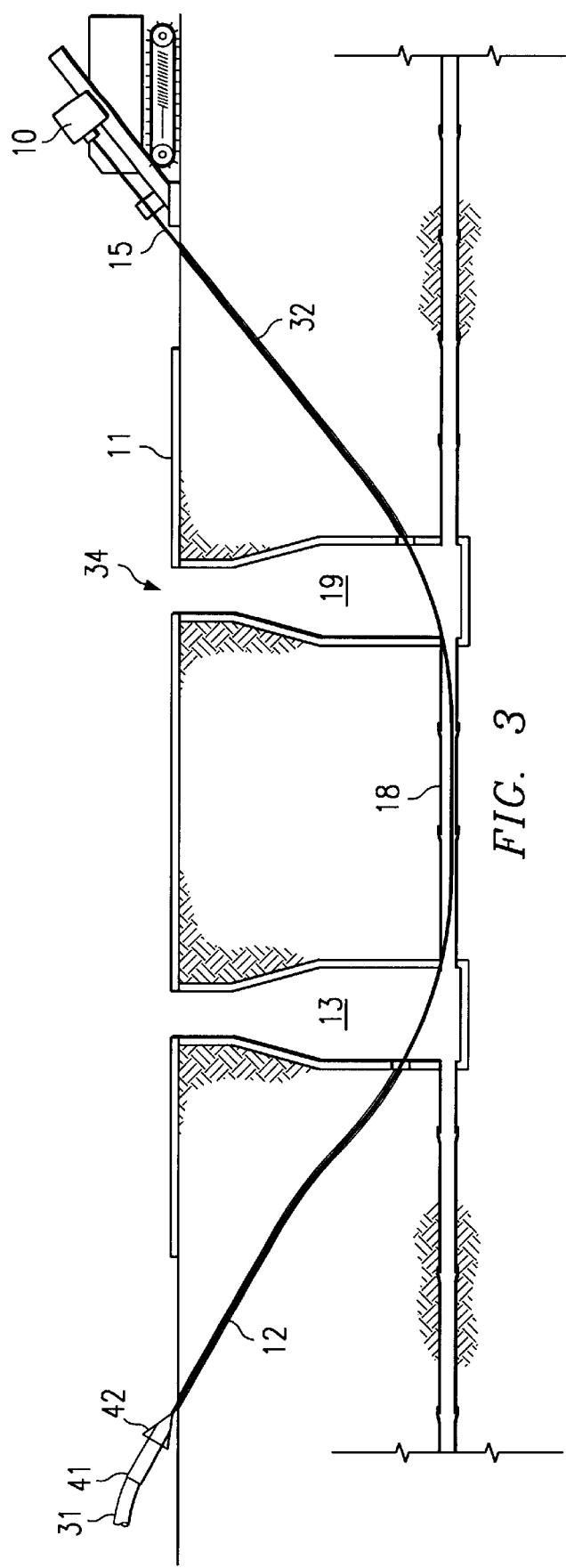
FIG. 3 is a schematic diagram of an installation according to an alternative method of the invention.

Elements numbered in FIGS. 11–19 with numbers one hundred higher than the same numbered element in FIGS. 1–10 are essentially identical thereto except as otherwise shown or described, and provide a corresponding function. While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and are not to limit the scope of the invention.

DETAILED DESCRIPTION

Turning now to FIGS. 1 and 2, in one example of the method of the invention, a directional boring machine 10 such as a Vermeer Navigator is positioned to the side of a roadway 11. Borer 10 is used to drill a hole 12 down at an angle from the machine 10 to the first manhole 13. A bit capable of drilling in rock, such as the one shown in Wentworth U.S. Pat. No. 6,148,935, the contents of which are incorporated by reference herein, is used in order to drill through the wall of the manhole 13. When the drill head emerges into manhole 13, the rock drill bit is preferably removed and replaced by a blunt tip such as a ball or bullet-shaped head that fits onto the front end of the drill string 15 or sonde housing, if one is used. A deflection plate 14 is positioned at an acute angle relative to the far corner of the manhole 13 as shown to provide support for the drill string and ensure that it continues in the desired direction. Plate 14 slopes downward from the hole 16 drilled through the wall of manhole 13 to the mouth 17 of the existing pipeline 18.

After replacing the drill bit, drill string 15 is advanced (pushed) by machine 10 preferably without rotation into mouth 17 and through the length of pipeline 18 until it emerges into the second manhole 19. Another deflection plate 21 is positioned to deflect the drill string upwardly, either in exit 22 as shown or in the near corner of second manhole 19. In second manhole 19, the rock drill bit is put back on, and the unit drills through the far wall of second manhole 19 and upwardly to the surface at a location preferably out of the roadway 11. At this point, the rock drilling bit is removed and the drill string is connected to a leading end of an impactor 30 according to the invention, which tows the replacement pipe 31 behind it. The impactor 30 has a greater diameter than the pilot hole 32 created by the last stage of drilling, and therefore widens the hole as it descends, pulling the replacement pipe 31 behind it. The internal impacts generated by impactor 30, when added to the pulling force on the drill string, widen the hole and hasten the progress of impactor 30 down through pilot hole 32.

When impactor 30 reaches second manhole 19 and engages the mouth of former exit 22, it splits and/or bursts the existing pipeline 18 as it is pulled through it. If pipeline 18 is cast iron, the impact force is needed in order to make steady progress. External blades 33 are provided for splitting the pipe into strips which can be pushed aside so that the new pipe 31, which is generally made of plastic such as HDPE, is pulled into place.

When impactor 30 emerges into first manhole 13, it is preferably removed and taken out through the manhole entrance 34. The drill string can then be withdrawn back through the original entry hole 12. The two holes in the walls of the manhole are then repaired, and holes 12 and widened hole 32 are filled in with dirt, cement or the like to complete the installation. One example of an impactor 30 is described hereafter. However, the impactor described in Wentworth et al. U.S. Pat. No. 5,782,311, the entire contents of which patent is incorporated by reference herein, could also be used in this method. One skilled in the art could also use a pneumatic impact tool such as a Hammerhead Mole made by Earth Tool Company LLC in place of a rotary impactor driven by the drill string, or a simple back reamer lacking an impact mechanism, if such would be adequate to burst the existing pipeline.

The foregoing method may be used with some variations in procedure when holes or vaults other than manholes take the place of one or both of manholes 13, 19 of the foregoing example. Likewise, in a version of the method where there are no manholes or vaults at all, the method can be practiced by tunneling down to the pipe at the start of a section to be replaced, traversing the pipeline for the desired distance, and then using a deflector plate or similar device inserted in the pipeline to cause the drill to tunnel up at an angle out of the pipeline. Where there are no vaults that permit changing tool heads, holes may be dug at the approximate positions of manholes 13, 19, if necessary.

In a variation of such a method using a pneumatic bursting tool (FIG. 3), the first access hole 12 is widened using a back reamer so that the replacement pipe 31 will fit through it. The second access hole 32 is then drilled at an angle to the other manhole 19, again by directional borer 10 positioned to the side of the roadway 11. The drill string 15 is then extended out all the way through hole 12 and the existing pipeline 18 between manholes 13, 19. Drill string 15 flexes to accommodate the bend (using deflection plates 14, 21 if necessary) and reaches all the way back through hole 12 to the original entrance. A pneumatic piercing tool 41 optionally with an expander 42 is connected to the end of drill string 15, which then pulls it back down through hole 12 into manhole 13. The connection may be by means of a short cable attached to eyes on the front end of tool 41 and an adapter at the front end of the drill string 15.

Tool 41 is then operated to burst existing pipeline 18 and pull the replacement pipe 31 behind it. This is aided by the pulling power of machine 10. When tool 41 reaches the second manhole 19, the plastic pipe 31 can be cut at both ends as needed to create a new pipeline between the manholes, and the tool 41 can be pulled out of the ground through the angled hole 32. In no case is it necessary to stop traffic in the vicinity of the manholes. A winch will not work for purposes of this method because the directional borer 10 both pushes and pulls in different steps of the procedure. If it is not desired to run the drill string past the first manhole 13, then a cable can be fed through hole 12 and attached between the piercing tool 41 and the end of the drill string 18. This method has the advantages of not needing to put a winch in the middle of the road where the manholes are, and not having to set up a winch inside a manhole.

Impactor 30 represents an improvement over the impactor of U.S. Pat. No. 5,782,311 in that it does not pass the entire force of impact through to the drill string and impact force is not lost due to pulling the weight of the replacement pipe upon impact. As shown in FIGS. 4–10, impactor 30 is connected by means of a joint 51 to a starter rod or other adaptor 52 at the end of the drill string. A front end portion 53 of a first rotary drive shaft 54 is configured with splines and transverse holes so that impactor 30 can be attached and removed manually as described in commonly-assigned Wentworth et al. Ser. No. 09/465,479, filed Dec. 16, 1999, the contents of which application are incorporated by reference herein.

Shaft 54 includes a cam 56 at a rear end thereof that rotates in unison with the drill string. A circular series of rounded lobes 57 and corresponding grooves on the end of cam 56 engage complementary lobes 60 and grooves on the end of a follower 59 as described hereafter. A cone-shaped housing 61 which comprises a forwardly tapering shell mounting blades 33 is mounted on shaft 54 by means of a sleeve 62 within which shaft 54 is free to rotate. Seals placed in annular grooves 66, 67 in shaft 54 prevent contaminants from entering the interior of the impactor, and a lubricant is injected from the drill string into the space between grooves 66, 67 through a radial hole 65 to keep the bearing surface at groove 66 clear of contaminants.

A tail cap 68 is secured over the rear end opening of housing 61 by means of bolts (not shown) that are received in aligned holes 69, 71. A striker 72 is mounted for lengthwise reciprocation over a short distance within the internal working chamber 73 of housing 61. As discussed below, striker 72 delivers impacts to a front end wall 74 of chamber 73 and is biased towards wall 74 by a circular formation of eight coil springs 76 each confined in rearwardly opening holes 77 in the striker 72 and forwardly opening recesses 79 in tail cap 68. Cam 56 is are mounted for rotation within a central bore 78 of striker 72. Follower 59 is preferably fixed (e.g., press fit) to the inside of striker 72 and does not rotate.

A central support shaft 81 (an extension of shaft 54 as shown) extends through follower 59 and is supported for rotation within a pipe pulling sleeve 82 by means of a bearing assembly 83. Bearing assembly 83 includes a bearing housing 84 that is press-fit into sleeve 82, which housing 84 supports bearing packs 86 and bearing cones 87 about the end of shaft 81, so that bearings 84 rotatably support shaft 81. Replacement conduit 31 is typically inserted into the rear end opening of sleeve 82 and held therein by screws set through holes 88 into the body of conduit 31.

Figure 8:
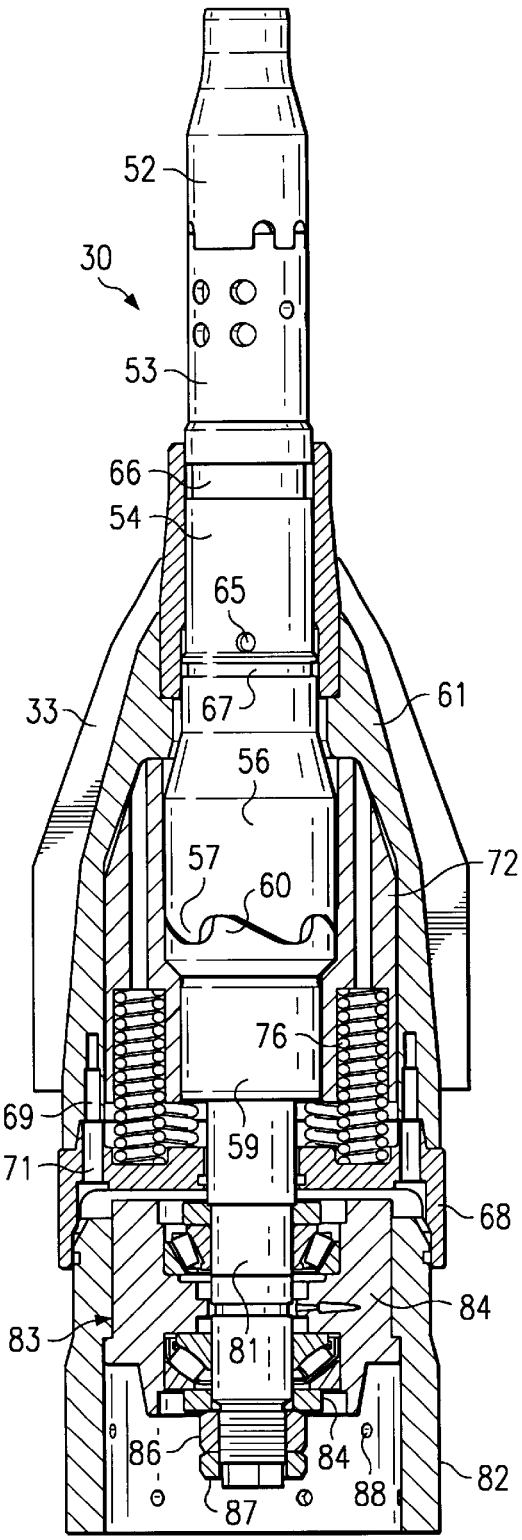
FIG. 8 is a lengthwise view, partly in section, of the impactor of FIG. 4 with the striker in its top position.
Figure 11:
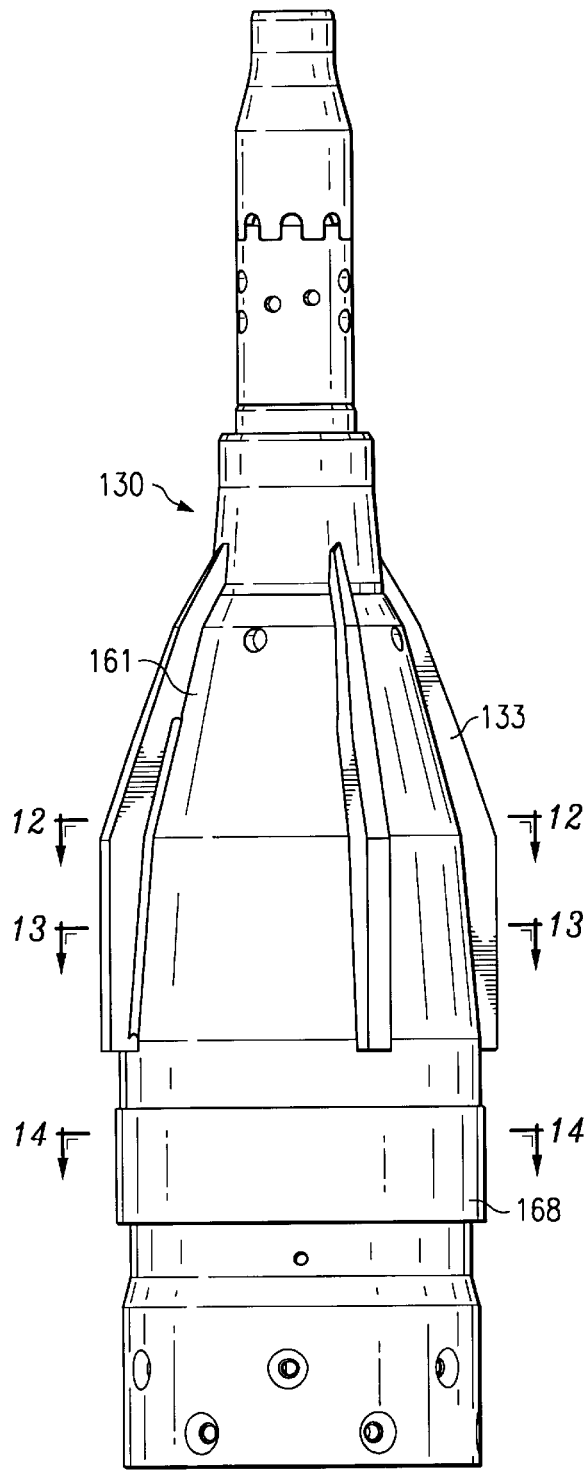
FIG. 11 is a side view of a second embodiment of an impactor according to the invention.
Figure 12:
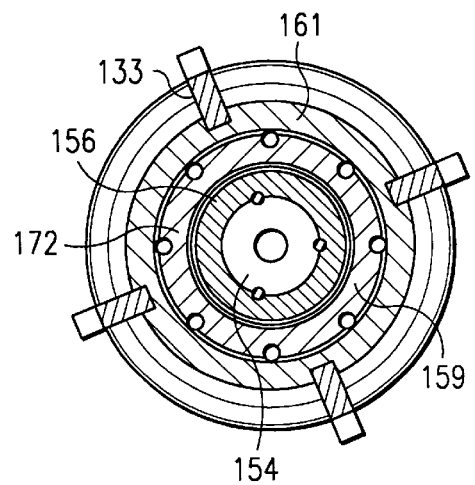
FIG. 12 is a cross-section taken along the line 12—12 in FIG. 11.
Figure 13:
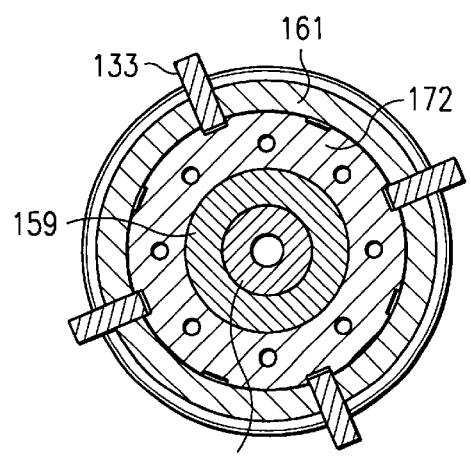
FIG. 13 is a cross-section taken along the line 13—13 in FIG. 11.
Figure 14:
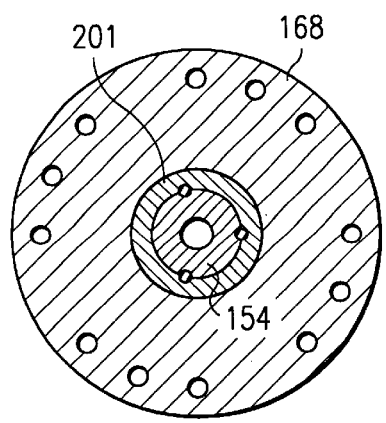
FIG. 14 is a cross-section taken along the line 14—14 in FIG. 11.
Figure 15:
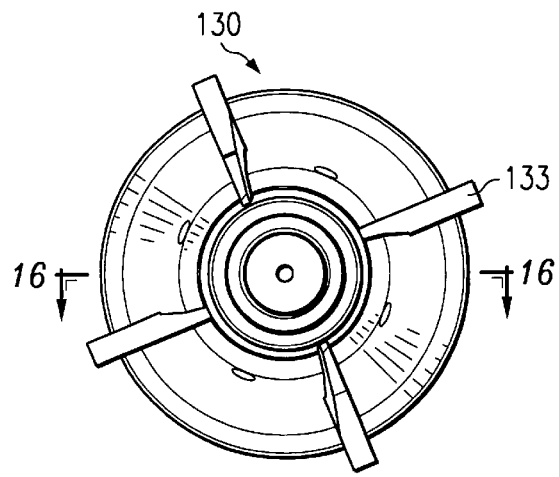
FIG. 15 is a top view of the embodiment of FIG. 11.
Figure 16:
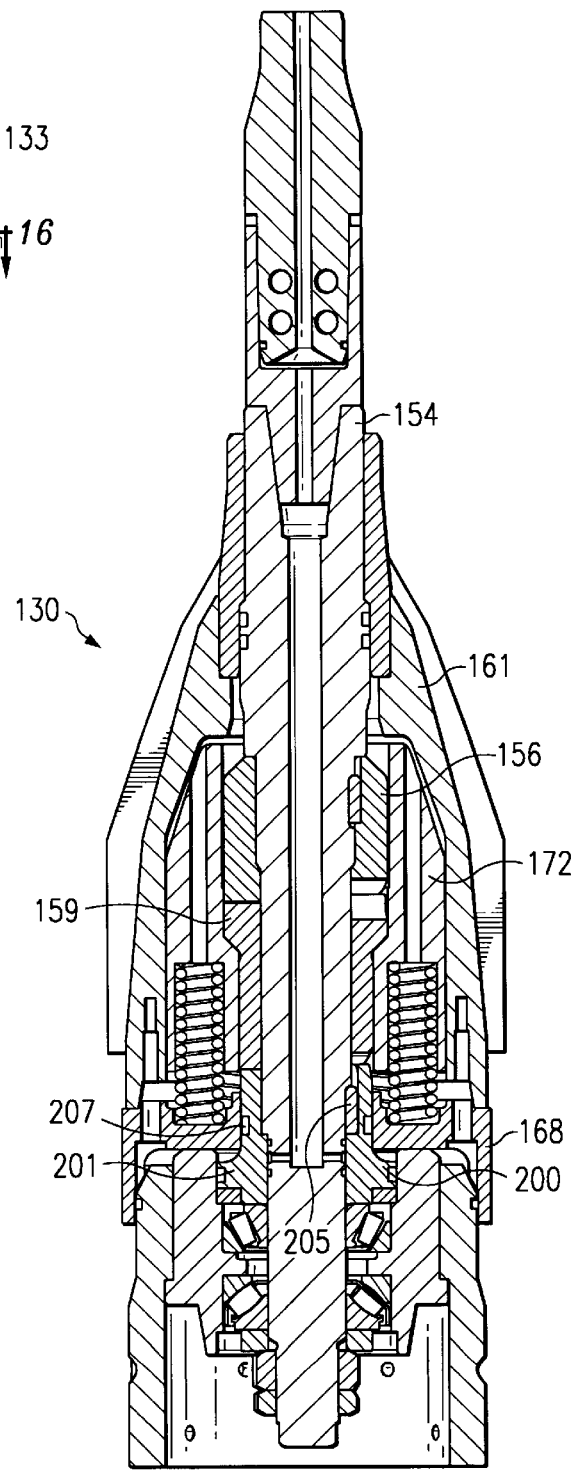
FIG. 16 is a lengthwise section taken along the line 16—16 in FIG. 15.
Figure 17:
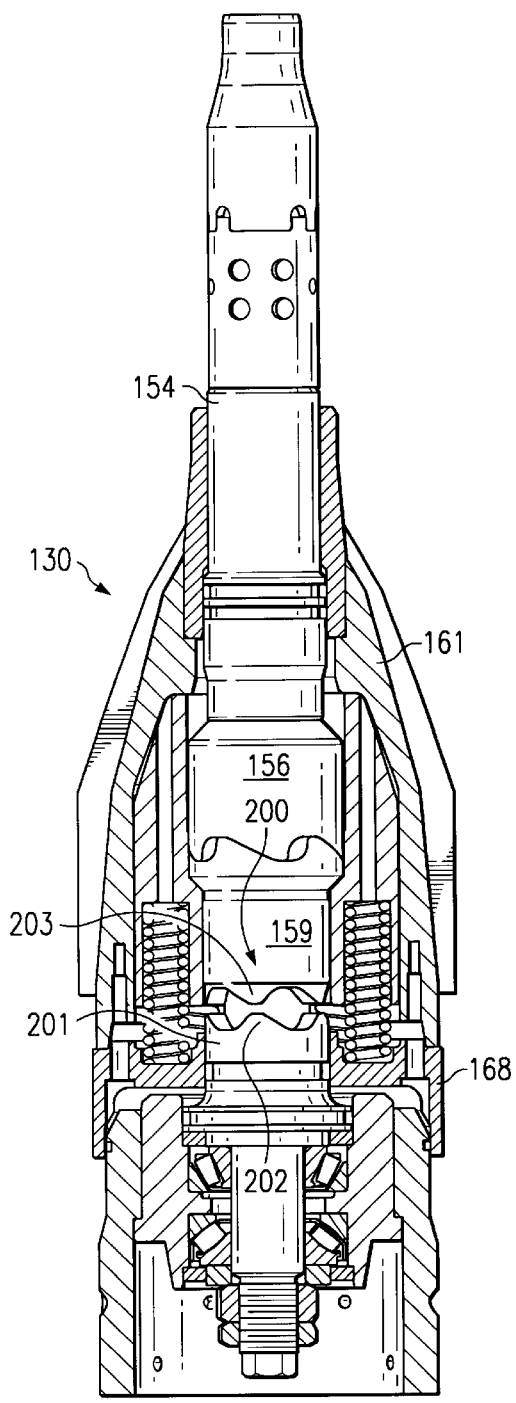
FIG. 17 is a lengthwise section of the embodiment of FIG. 11, showing the striker at the front of its stroke.
Figure 18:
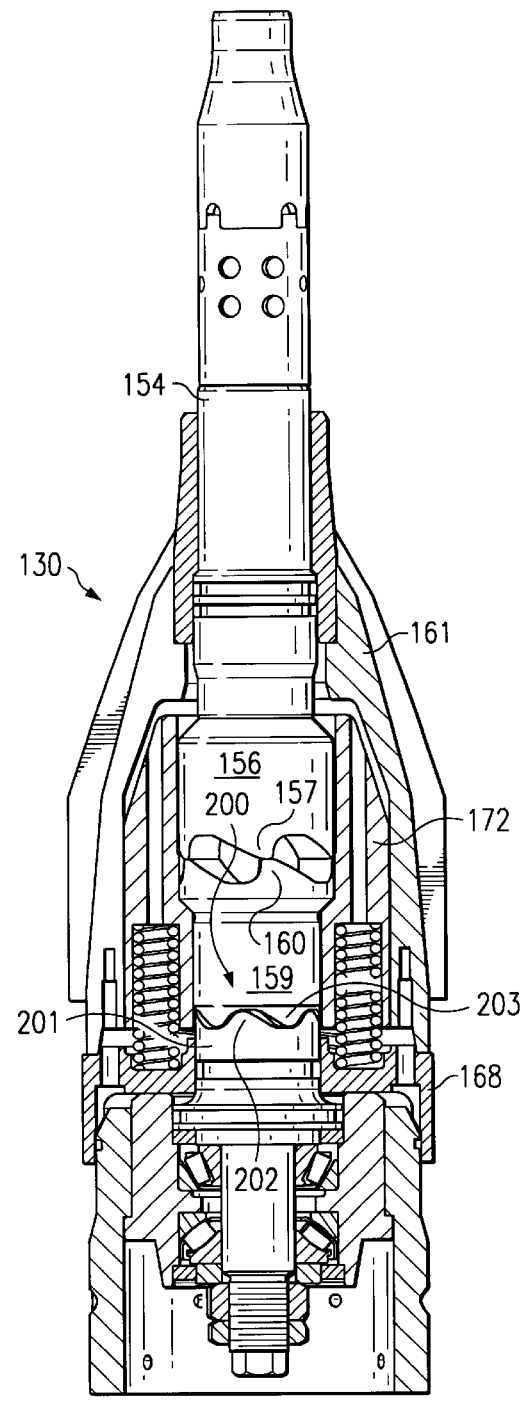
FIG. 18 is the same view as FIG. 17, but showing the striker at the back of its stroke.
Figure 19:
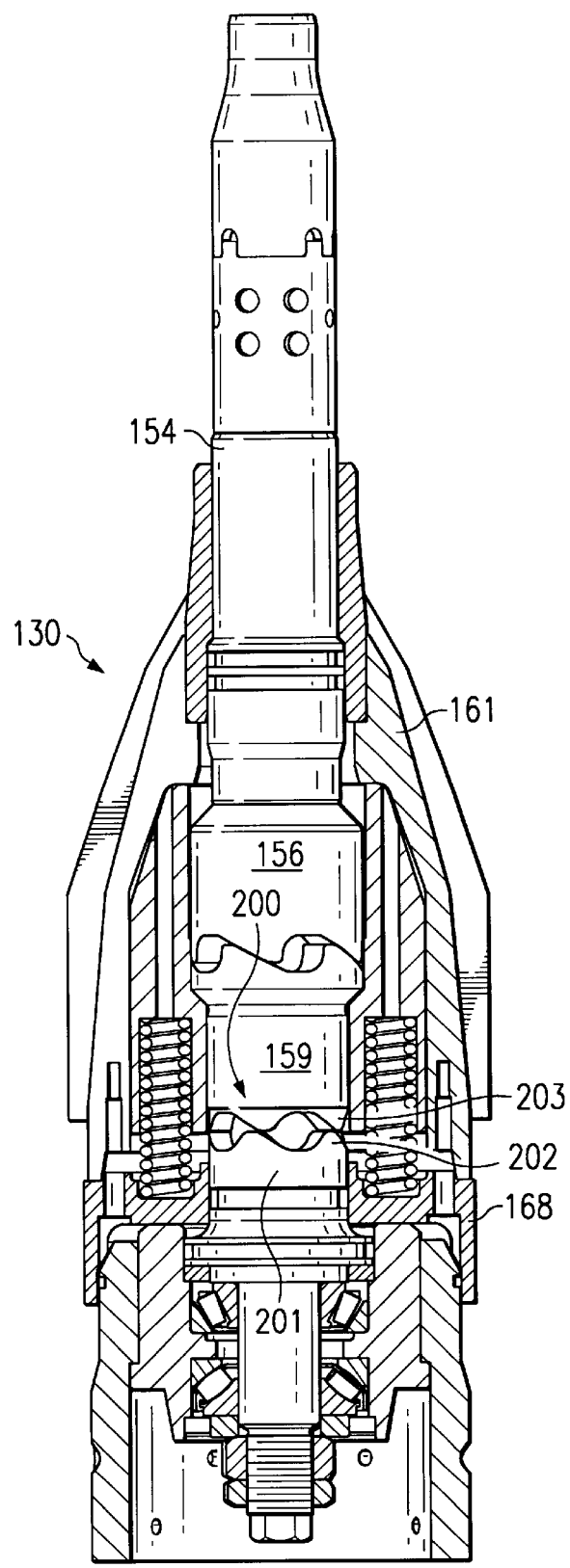
FIG. 19 is the same view as FIG. 17, but showing the striker at a neutral position.

Suitable means are provided on the rear end of shaft 81 to retain bearing assembly 83 and couple the rear pipe pulling assembly including sleeve 82 and the parts attached to it to the impactor housing 61 in a manner that permits housing 61 to move forward a short distance upon receiving an impact from striker 72 without dragging the pipe pulling assembly along behind, which would lessen the power of impact. For this purpose, housing 61 slides forward upon impact opening a slight clearance between cap 68 and bearing housing 84 as shown in FIG. 8. A washer 84 engaging bearing assembly 83 is held by a nut 86 and jam nut 87 that are each threadedly secured on the rear end of shaft 81.

As shown in FIGS. 9 and 10, drilling lubricant flows through a central fluid passage 91 in shaft 54 and enters a similar passage 92 in shaft 81. Passage 92 leads to a series of four equiangularly spaced radial passages 93 that communicate with aligned radial ports 94 in pulling sleeve 82 to inject drilling fluid into behind the impactor (although the portion that passes through hole 65 enters the hole ahead of the impactor.)

Figure 7:
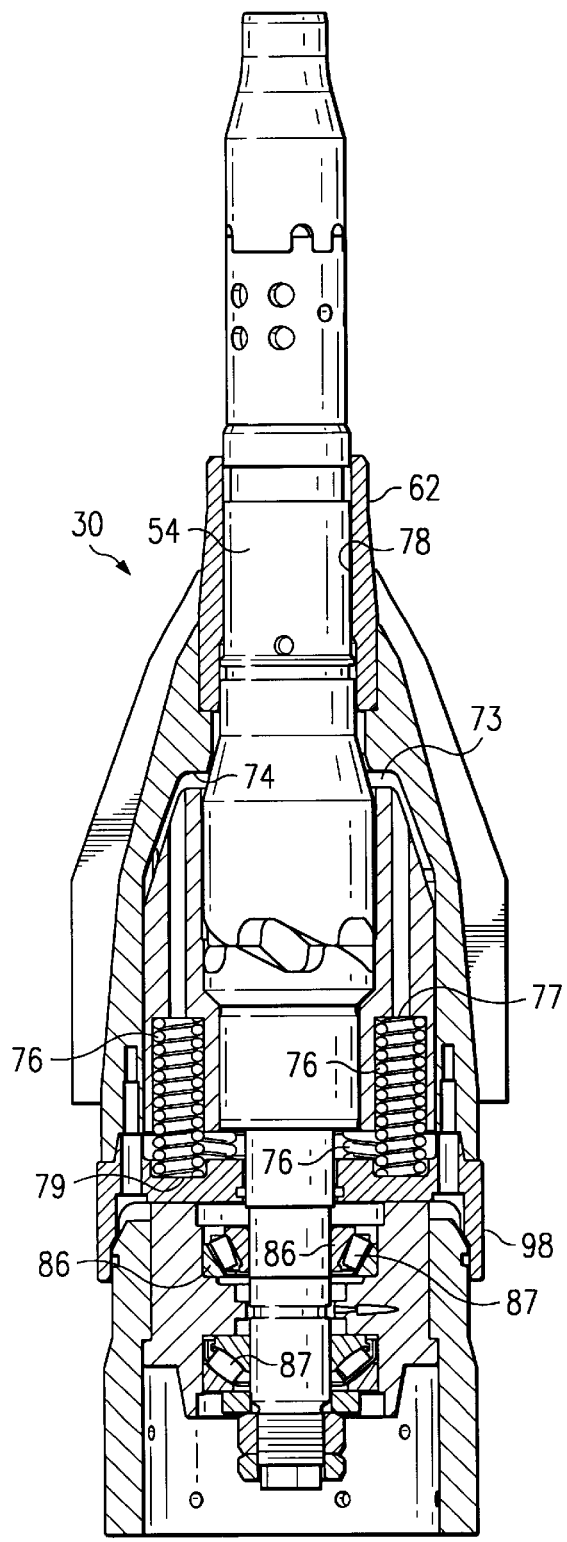
FIG. 7 is a lengthwise view, partly in section, of the impactor of FIG. 4 with the striker in its bottom position.

In operation, rotation of the drill string rotates cam 56. Follower 59 is essentially stationary relative to cam 56. As such, the movement of lobes 57 causes the cam 56 and follower 59 to assume the position shown in FIG. 7, wherein the lobe tops engage one another and the follower is rearwardly displaced relative to the cam. A shoulder 96 on follower 59 engages a flange 97 on the inside of striker 72, forcing the striker rearwardly and compressing springs 76 (FIG. 7). When lobes 57 fall off the corresponding lobes of follower 59 and return to the position shown in FIG. 8, the striker is propelled forward by springs 76 and impacts against wall 74. The momentum of impact is transferred to housing 61, which moves forward a short distance and widens the existing hole, and blades 33 act to burst the existing pipe. A rear tubular end portion 98 of end cap 68 slides along the outside of pipe pulling sleeve 82, and a groove 99 for a seal ring may be provided to prevent contaminants from entering the mechanism at this point. Since the impactor housing moves forward without carrying the replacement pipe along with it, it delivers a greater impact force for expanding the hole (whether or not an existing pipeline to be burst is present.) Since the impactor also slides along the outside of shaft 54, the force of impact is not directly transmitted to the drill string, lessening wear on the drill string and directional boring machine. As shown in FIG. 5, according to a preferred form of the invention, the blades 33 penetrate through slots 101 in housing 61 and engage grooves 102 in the outside of striker 72. Blades 33 extend into the surrounding soil restraining rotation of housing 61. This also helps prevent unwanted rotation of the striker inside of the impactor housing.

Referring now to FIGS. 11–19, impactor 130 is similar to impactor 30 in many respects, and the description herein will focus on the differences between the two embodiments. A shaft powered impactor 30 as described in FIGS. 1–10 is driven by a (normally) long drill string. The length of the string makes it very elastic in a torsional direction. The action of the impactor 30 with its (5) cam lobes 57 or (5) impacts per revolution causes the torque on the drill string to vary from zero to peak (impactor) torque, (5) times per revolution. The torsional elasticity of the joint will result in the drive end (directional boring machine end) of the string to rotate at more or less constant angular velocity, while the angular velocity at the impactor 30 varies radically (5) times per revolution due to the variation in torque. Energy is stored in the drill string by twisting it. When the torque at the output end becomes high enough to lift the striker 72 (rotate cam 56), the shaft 54 accelerates angularly and will, in the situation of a long drill string, actually overshoot the next cam 'event'. This causes the cam 56 to crash, or skip over, one or more lobes of the follower 59. The system is termed dynamically unstable, as the spring-mass system does not allow for smooth behavior within the desired commercial operating conditions.

A solution according to this embodiment of the invention is to guide the rotation of the shaft 154 of impactor 130 not only during the lift portion of the cam 156, but also throughout the window of time just after the cam 156 has reached peak lift. This can be done with a "back-cam" mechanism 200 that controls the backlash or slop in the system. The back-cam mechanism 200, located at the rear of the striker, does not allow the shaft 154 to accelerate angularly at will upon release of the load due to lift of the cam 156. This back-cam 200 will catch shaft 154 and force it to stay in an angular orientation that allows a clean impact of the striker 172 against the active head which comprises housing 161. Only then, after the striker 172 has impacted, does back-cam 200 set shaft 154 free to actuate the next cam lobe 157. Back cam mechanism 200 does not reduce the variation in drive torque the drill string sees at the impactor 130, but does however function to control the angular movement of shaft 154, which results in a cleaner operating impactor.

As shown, back cam mechanism 200 includes a rear cam 201 having lobes 202 that engage complementary lobes 203 on a rear end of follower 159. Cam 201 is mounted directly on shaft 154 inside of end cap by means of drive pins 205 which allow torque transfer from the drill string via shaft 154 to the rear cam 201. When the impactor 130 is in the position shown in FIG. 18, lobes 202 are in engagement with lobes 203, preventing crashing as described above. A seal bearing may be provided in an annular groove 207 to prevent leakage of lubricating oil from the inside of housing 161. Cam 156 is preferably provided as a tubular member separate from shaft 154 and driven by a further set of drive pins 208. Reducing the number of cam lobes from five to four or most preferably three also provides improved performance.

Blades 133 as shown in FIGS. 11–19 are substantially the same as shown for blades 33. However, according to a further aspect of the invention, it is preferred that these blades be welded directly to the outside of the housing 161, and that a separate spline and groove system be provided between the outside of the striker and the inside of the housing for providing a reaction torque to the associated cam and follower. This permits the external blades to be made larger and stronger, less prone to breakage.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims.

What is claimed is:

1. A method for replacement of an existing pipeline, comprising:

(a) forming a first access opening from a first location on the surface of the ground to a starting location of the pipeline;

(b) forming a second access opening from a second location on the surface of the ground to a finishing location of the pipeline;

(c) then inserting a drill string through the first access opening, then into the pipeline at the starting location, then through the inside of the pipeline to the finishing location, then out of the pipeline through the second access opening;

(d) then installing a pipe bursting device on the drill string, the device having a length of replacement pipe attached thereto;

(e) then pulling the drill string with the pipe bursting device attached back through the second access opening and into the pipeline, thereby drawing the replacement pipe behind the pipe bursting device;

(f) then pulling the pipe bursting device through the existing pipeline to burst the existing pipeline and pull the replacement pipe in to replace the existing pipeline;

(g) removing the pipe bursting device from the replacement pipe when the replacement pipe is fully installed; and (h) removing the pipe bursting device and drill string from the ground.

2. The method of claim 1, wherein the pipe bursting device comprises an impactor that delivers cyclic impacts to aid in bursting the existing pipeline.

3. The method of claim 2, wherein the impactor includes a housing, a striker disposed within the housing and a mechanism for causing the striker to deliver impacts to the housing in response to rotation of the drill string.

4. The method of claim 1, wherein the pipe bursting device comprises an expander.

5. The method of claim 1, wherein steps (a)–(e) comprise:

drilling the first access opening with a directional boring machine using a drill string having a drill bit mounted thereon;

removing the bit and then inserting the drill string through the existing pipeline from the starting location to the finishing location;

replacing a drill bit on the drill string and drilling the second access opening;

then replacing the drill bit with the pipe bursting device; and pulling the pipe bursting device through the second access opening, thereby widening the second access opening, prior to pulling it through the existing pipeline.

6. The method of claim 1, wherein holes from the ground surface to the pipeline exist at the starting location and the finishing location.

7. The method of claim 6, wherein the holes are manholes, and the method further comprises drilling the first access opening with a directional boring machine using a drill string having a drill bit mounted thereon which drills a hole in a wall of a first manhole, which manhole adjoins the starting location.

8. The method of claim 6, wherein the first and second access openings comprise tunnels defining acute angles relative to the ground, the existing pipeline is substantially horizontal, and further comprising a step of placing a deflection plate in a position within the hole at the starting location for contacting the drill string and deflecting it from its acute angle in the first access opening to the direction of the existing pipeline.

9. The method of claim 1, wherein the first and second access openings comprise tunnels defining acute angles relative to the ground, and the existing pipeline extends in a substantially horizontal direction.

10. The method of claim 1, wherein in steps (e) and (f), the pipe bursting device is pulled without rotation.

11. The method of claim 1, wherein:

(a) forming a first access opening from a first location on the surface of the ground to a starting location of the pipeline comprises drilling the first access opening with the directional boring machine positioned at the first location on the surface of the ground using the drill string having a drill bit mounted thereon; and (f) then pulling the pipe bursting device through the existing pipeline to burst the existing pipeline and pull the replacement pipe in to replace the existing pipeline with the directional boring machine positioned at the first location on the surface of the ground using the drill string having the pipe bursting device mounted thereon.

12. A method for replacement of an existing pipeline, comprising:

forming an access opening with a directional boring machine using a drill string having a drill bit mounted thereon, the access opening extending from the directional boring machine to a starting location for replacing the existing pipeline;

removing the drill bit at the starting location and then inserting the drill string through the existing pipeline from the starting location to a finishing location for replacing the existing pipeline;

then attaching a pipe bursting device to the drill string at the finishing location;

pulling the pipe bursting device from the finishing location to the starting location; and pulling the replacement pipe through the pipeline from the finishing location to the starting location.

13. The method of claim 12, wherein holes from the ground surface to the pipeline exist at the starting location and the finishing location.

14. The method of claim 13, wherein the holes are manholes, and the method further comprises drilling the access opening with the directional boring machine using the drill string having the drill bit mounted thereon which drills a hole in a wall of one of the manholes, wherein the starting location adjoins the manhole.

* * * * *